US011952802B2

(12) United States Patent
Promutico et al.

(10) Patent No.: US 11,952,802 B2
(45) Date of Patent: Apr. 9, 2024

(54) DOOR-LOCKING DEVICE WITH IMPROVED SAFETY MODULE

(71) Applicant: BITRON S.p.A., Turin (IT)

(72) Inventors: Fabrizio Promutico, Turin (IT); Felice Paglia, Turin (IT)

(73) Assignee: Bitron S.p.A., Turin (IT)

( * ) Notice: Subject to any disclaimer, the term of this patent is extended or adjusted under 35 U.S.C. 154(b) by 323 days.

(21) Appl. No.: 17/328,391

(22) Filed: May 24, 2021

(65) Prior Publication Data

US 2021/0363786 A1 Nov. 25, 2021

(30) Foreign Application Priority Data

May 25, 2020 (IT) ........................ 102020000012178

(51) Int. Cl.

| | |
|---|---|
| ***E05B 65/00*** | (2006.01) |
| ***A47L 15/42*** | (2006.01) |
| ***D06F 37/28*** | (2006.01) |
| ***D06F 37/42*** | (2006.01) |
| ***D06F 39/14*** | (2006.01) |

(52) U.S. Cl.

CPC .......... *E05B 65/00* (2013.01); *A47L 15/4259* (2013.01); *D06F 37/28* (2013.01); *D06F 37/42* (2013.01); *D06F 39/14* (2013.01)

(58) Field of Classification Search

CPC ...... D06F 37/28; D06F 39/14; A47L 15/4259; E05B 2047/0067; E05B 2047/0068; E05B 2047/0069

See application file for complete search history.

(56) References Cited

U.S. PATENT DOCUMENTS

| | | | | |
|---|---|---|---|---|
| 4,032,180 | A | 6/1977 | Pohl | |
| 2018/0008120 | A1* | 1/2018 | Dirnberger | D06F 37/42 |
| 2020/0378052 | A1* | 12/2020 | Choi | E05B 47/026 |

FOREIGN PATENT DOCUMENTS

| | | | | |
|---|---|---|---|---|
| WO | WO 2013/151964 A1 | 10/2013 | | |
| WO | WO 2018/189642 A1 | 10/2018 | | |
| WO | WO-2018189642 A1 * | 10/2018 | | D06F 34/20 |

OTHER PUBLICATIONS

Italian Search Report in IT 102020000012178 dated Oct. 15, 2020.

* cited by examiner

*Primary Examiner* — Christine M Mills
*Assistant Examiner* — Yahya Sidky
(74) *Attorney, Agent, or Firm* — Knobbe, Martens, Olson & Bear, LLP

(57) ABSTRACT

A door-locking device for a household appliance, such as a washing machine, a dishwasher and the like, of the type having a door, with a lug, wherein the door-locking device comprises a slider arranged so as to assume a disengagement and an engagement position with the lug of the household appliance door, a detection and safety module.

7 Claims, 12 Drawing Sheets

FIG.1
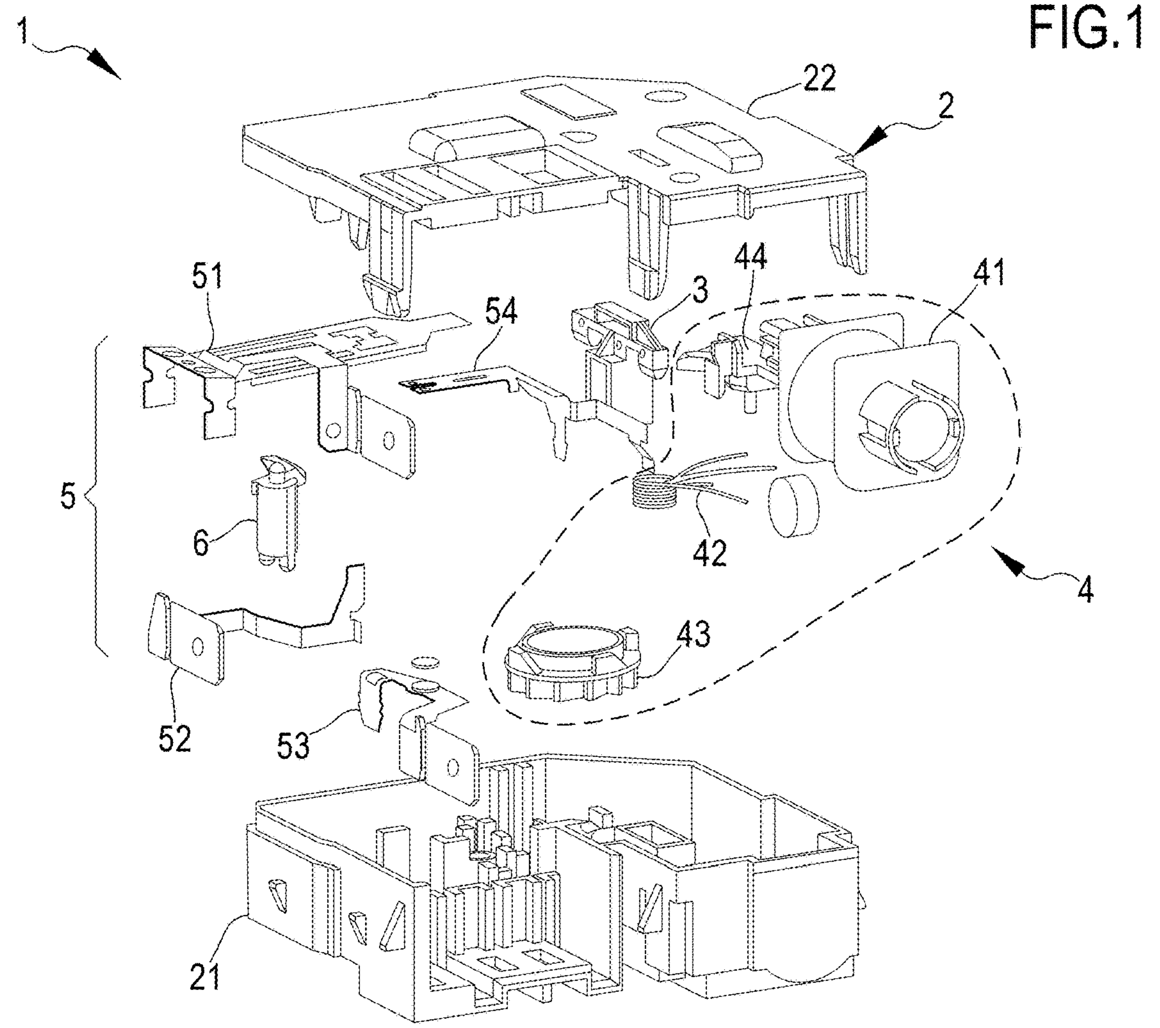
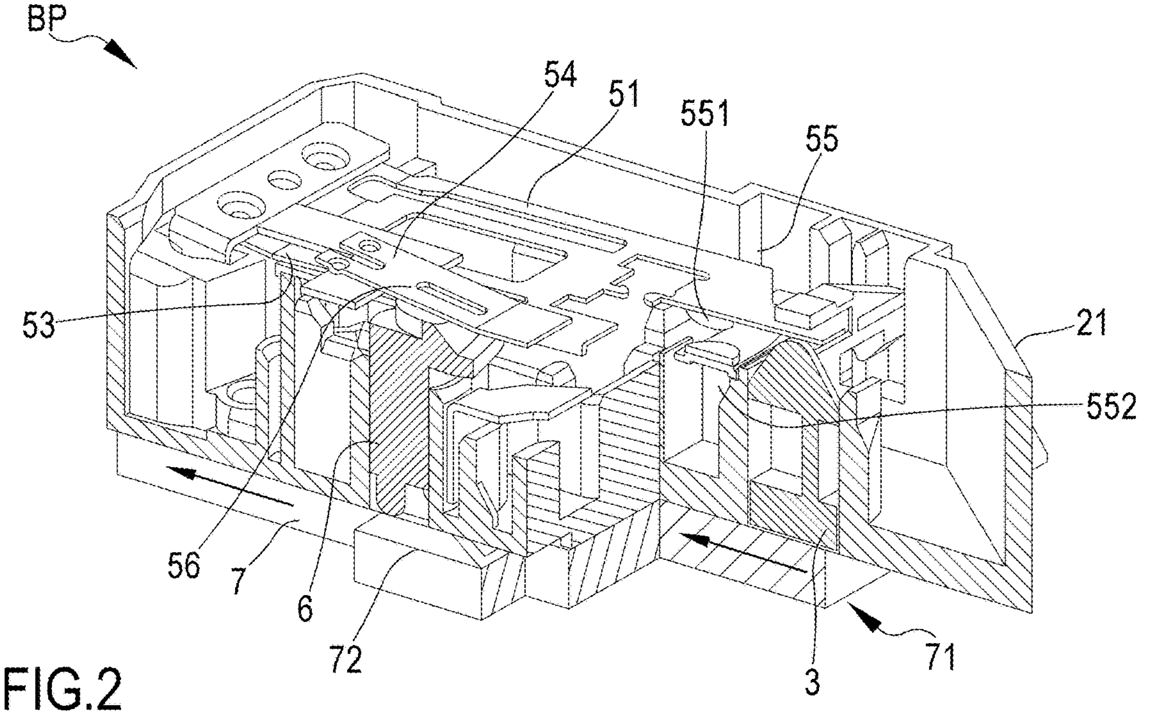
FIG.2

FIG.4
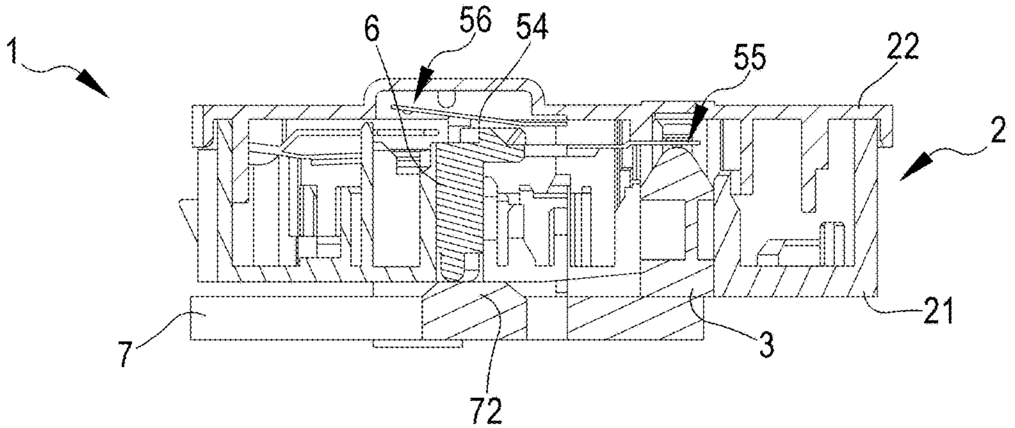
FIG.3
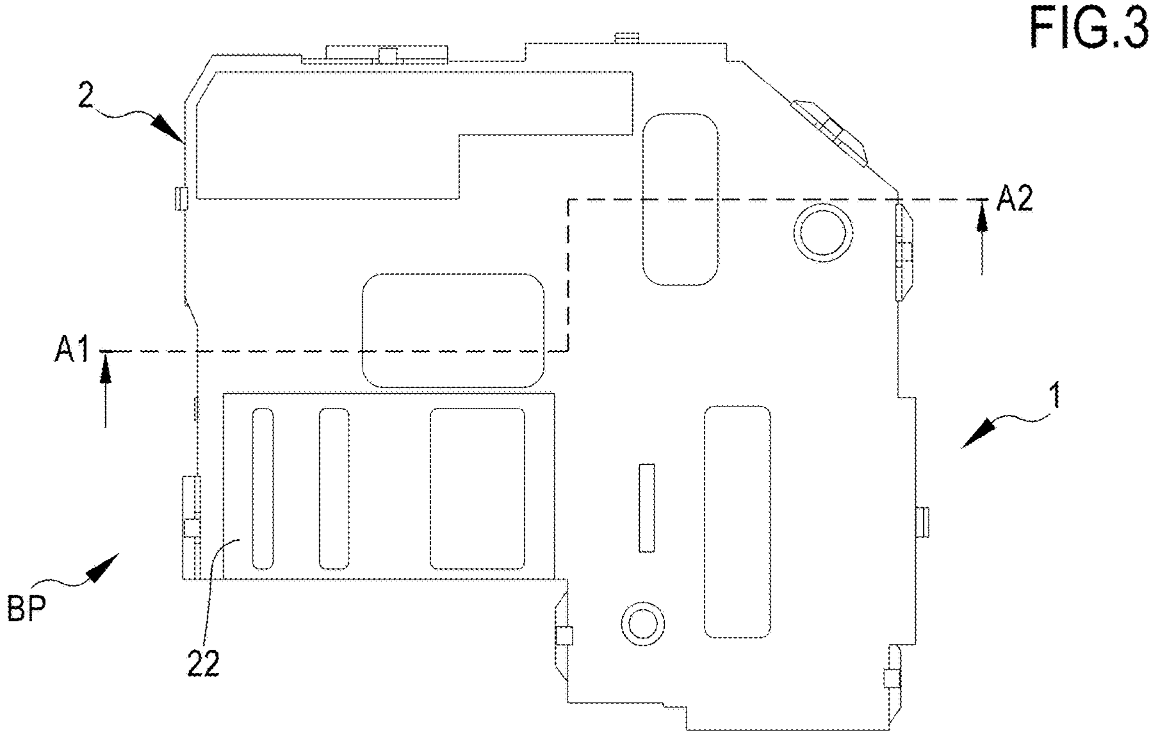
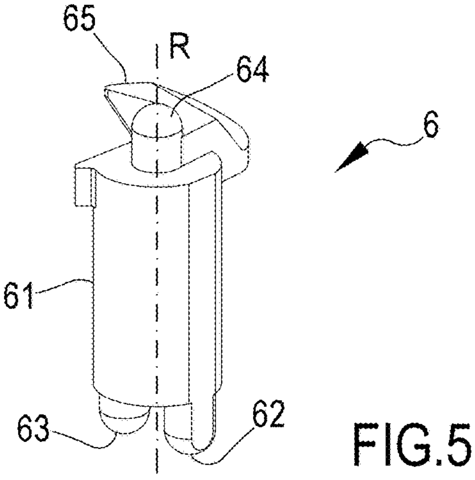
FIG.5

FIG.8
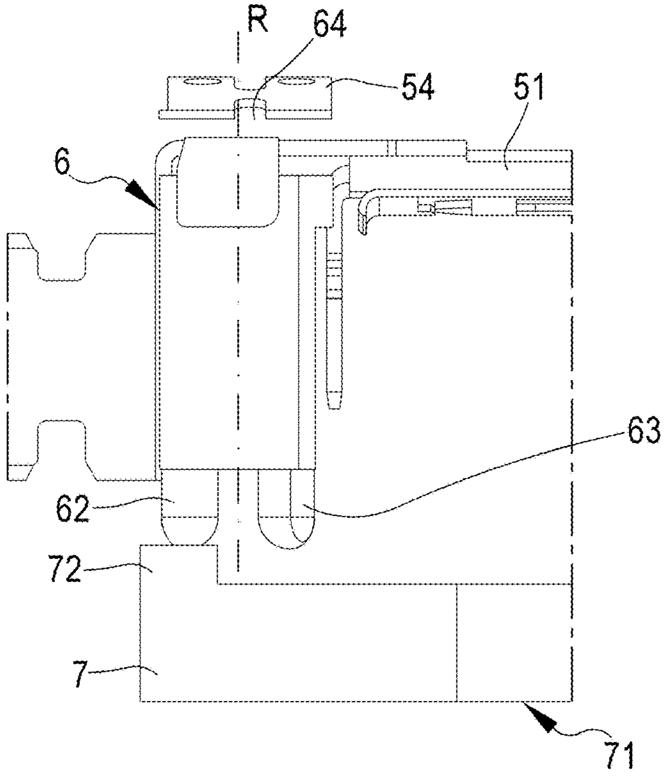
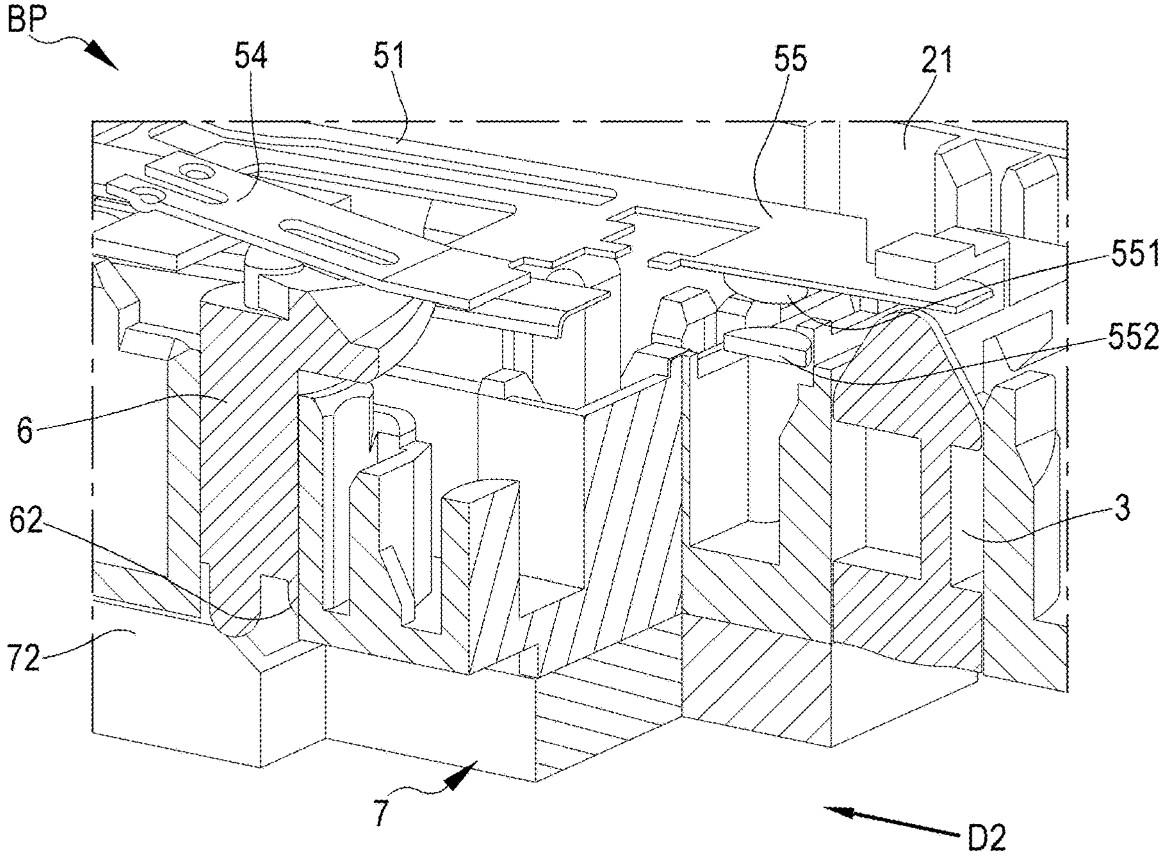
FIG.9

DOOR-LOCKING DEVICE WITH IMPROVED SAFETY MODULE

The present invention relates to a door-locking device with improved safety module.

FIELD OF THE INVENTION

More specifically, the invention relates to a door-locking device to be installed within a door-locking device for household appliances, in particular washing machines and the like, designed and manufactured in particular to ensure greater safety and reduce any risk of closing the door.

In the following the description will be addressed to the installation in a washing machine, but it is clear that it should not be considered limited to this specific use.

PRIOR ART

As is well known current door-locking device installed in the washing machines are equipped with an electro-mechanical safety module.

Such blocking safety module is configured to interact in general with a slider, interacting in turn with the lug of the washing machine door.

In particular, when the washing machine door is closed, the lug, in addition to engaging with the door lock, in order to keep the washing machine door closed, moves a slider with its own encumbrance. The slider is thus capable of passing from a position indicating the opening of the door to one indicating the closure.

Said slider also generally has a surface opening or window. Furthermore, said slider also has a sensor relief.

The door-locking device safety module is generally arranged above the slider.

Said safety module is provided internally with a coil that can be activated energized by the control logic of the washing machine, a locking pin, driven by said coil by means of suitable mechanical means, and capable of assuming, when it is moved, a retracted position, and an extracted position.

The locking pin and the slider are mutually arranged so that, when the door is open, the slider is in a position such that to prevent locking pin to move from the retracted position to the extracted position with its own encumbrance; while, when the door is closed, the slider is in a position such that the opening window obtained on it overlaps the locking pin, so as to allow the possible passage from the retracted position to the extracted position.

The locking pin is also connected so as to close an electrical contact of a main switch when it is in the extracted position, and open it when it is in the retracted position. In this way, it is possible to provide a signal to the household appliance control logic, indicating that the door-locking block in safety in the door closing, precisely by means of the locking pin.

The safety module also comprises a safety pin that interacts with the moving slider, such that, when the latter is in the position in which the door is closed, said safety pin enables the closure of a further contact or electrical or safety switch, series arranged to the coil, so as to make possible the energization of the same, only in the closed door condition.

Normally, when the door is opened, the safety switch, driven by the safety pin, is deactivated, i.e., it opens, before the slider begins to assume one of the positions according to which it does not allow the locking pin to pass from the retracted position to the extracted position. In other words, said safety switch is reopened before the slider can "cover" the locking pin.

In general, it is necessary to avoid that the safety switch can close in too proximity of the moment in which the slider does not allow the extraction of the locking pin (which in the following may also be called the locking point or "lockability point").

A technical problem of the solutions according to the prior art, such as the one described above, is that when the drum of the washing machine, for example, is particularly loaded, stresses can be created on the lug of the door, and consequently on the slider of the door-locking device, which can increase the risk that, when the sensor switch is open, and the main switch is closed (for which the locking pin is pulled out), the risk of a "stall position" is avoided, in which the sensor switch can open too close to the locking point, preventing the coil from being energized and therefore not being able to move the locking pin.

It is clear that this procedure is expensive in terms of safety.

SUMMARY OF THE INVENTION

In light of the above, it is therefore an object of the present invention to propose a door-locking device capable of overcoming the limitations of the prior art.

Another object of the invention is to propose a safety module that can be easily adapted or installed in the door-locking devices currently on the market.

OBJECT OF THE INVENTION

It is therefore specific object of the present invention a door-locking device for a household appliance, such as a washing machine, a dishwasher and the like, of the type having a door, with a lug, wherein said door-locking device comprises a slider arranged so as to assume a disengagement and an engagement position with the lug of the household appliance door, a detection and safety module, having a main conductive plate, a locking pin, capable of assuming capable of assuming a retracted position, and an extracted position, in which is capable of engaging with said slider when it is in said engagement position, a main switch, arranged on said main plate, so as to be opened when said locking pin is in said retracted position, and to be closed when said locking pin is in said extracted position, wherein when said main switch is closed indicates that the slider is locked by said locking pin in said engagement position, a sensor switch, arranged in series with said main switch, for indicating, when it is closed, that said slider is in said engagement position, and a safety pin, that interferes with said slider, so that when said slider moves from said disengagement position to said engagement position, said safety pin closed said sensor switch, characterized in that said main plate is fixed to said locking pin, so that when said locking pin is in said retracted position, said main plate is in a first position, instead, when said locking pin is in said extracted position, said main plate is in a second position, and in that said safety pin comprises a lower relief, arranged so that, when said slider interferes with said lower relief, rotates said safety pin, and a flap arranged so that, when said safety pin rotates, interferes with said main plate, wherein the rotation of said safety pin changes according to the position of said main plate.

Always according to the invention, said slider may comprise a safety relief which interferes with said lower relief when said slider moves from said disengagement position to said engagement position.

Still according to the invention, said safety pin may comprise a body, of cylindrical shape, having an axis of symmetry, a lower base and an upper base, wherein said rotational relief is arranged on said lower base, in an eccentric way with respect to said axis of symmetry, and wherein said flap is arranged in correspondence with said upper surface.

Advantageously according to the invention, said safety pin may comprise a second rotational relief eccentrically arranged with respect to said axis of symmetry.

Further according to the invention, said device may comprise an elastic lamella arranged so as to interfere with the top of said safety pin, and said sensor switch may be made by means of said main plate and said elastic lamella.

Always according to the invention, said safety pin may comprise an upper relief, intended to interfere with said elastic lamella for raising or lowering it.

Still according to the invention, said slider may have an opening, arranged so that, when said slider is in said engagement position, said opening in arranged in correspondence with said locking pin, allowing the movement of said locking pin from said retracted position to said extracted position.

BRIEF DESCRIPTION OF THE DRAWINGS

The present invention will be now described, for illustrative but not limitative purposes, according to its preferred embodiments, with particular reference to the figures of the enclosed drawings, wherein:

FIG. 1 illustrates an exploded view of a first embodiment of a door-locking device according to the present invention;

FIG. 2 illustrates a partial section of the door-locking device according to the present invention;

FIG. 3 illustrates a top view of the door-locking device according to the present invention;

FIG. 4 illustrates a section along the line A1-A1 of FIG. 3;

FIG. 5 illustrates a perspective view of a safety pin of the door-locking device according to the present invention;

FIG. 8 illustrates a section of a portion of the door-locking device according to the present invention;

FIG. 9 illustrates a perspective view of a section of a door-locking device according to FIG. 7;

DETAILED DESCRIPTION

Figure 6:
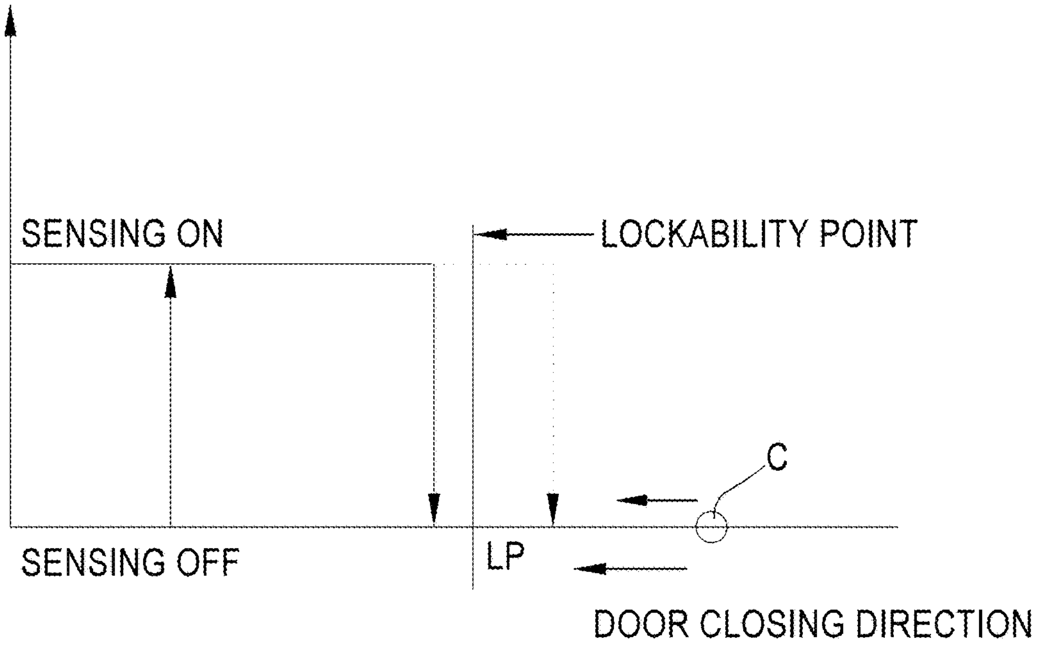
FIG. 6 illustrates a graph showing the activation of a sensor switch with respect to the position of the door lug, when the door is open.
Figure 7:
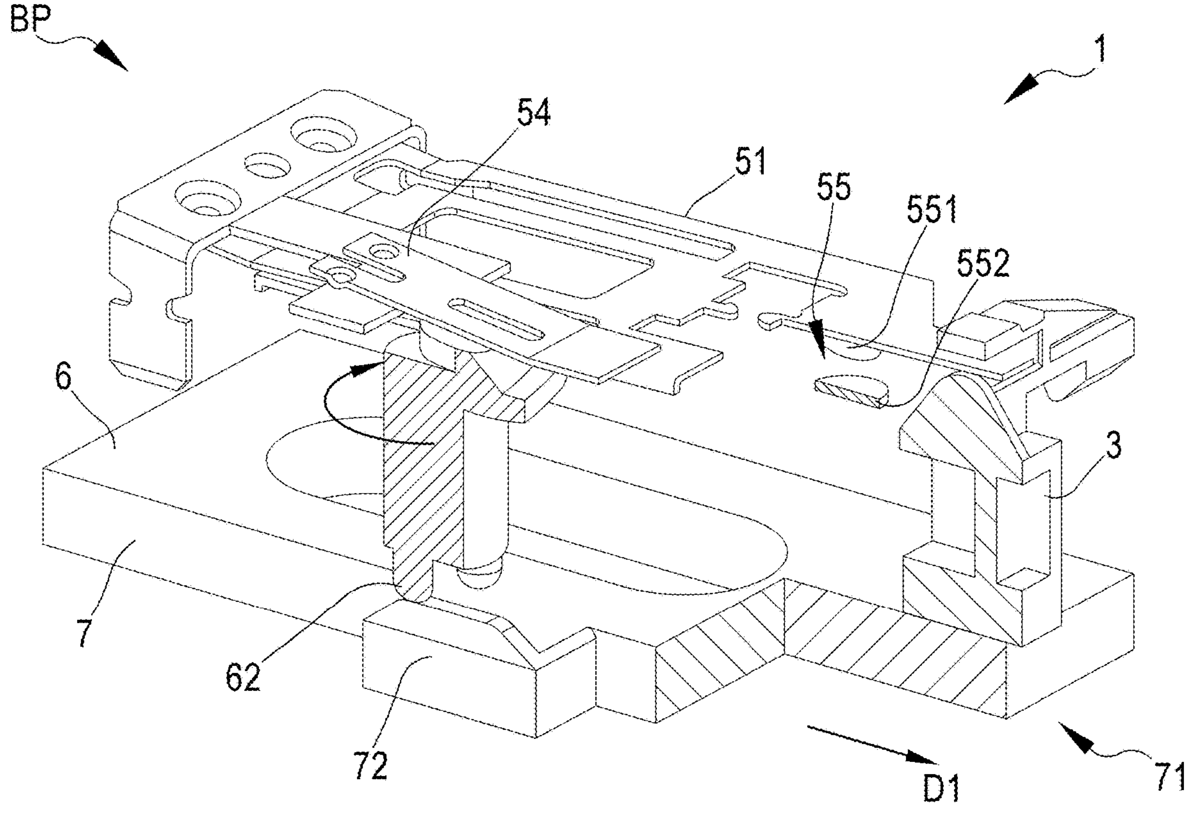
FIG. 7 illustrates a perspective section of the door-locking device according to the present invention in the door closing step.

In the various figures similar parts will be indicated with the same numerical references.

With reference to the FIGS. 1, 2, 3, and 4, it is possible to see part of a door-locking device BP and a safety device 1 according to the present invention.

More specifically, the safety module 1 is arranged within the door-locking device BP generally installed in a washing machine or household appliance in general. The washing machine comprises a door, which in turn has a lug. When the door is closed, the lug interacts with the door-locking device BP, as better explained below.

In particular, said safety module 1 essentially comprises a containment casing 2, a locking pin 3, an activation unit 4, for activating the locking pin 3, an electric circuit 5, and a safety pin 6.

The containment casing 2 comprises a base portion 21, which comprises cavities, within which various elements contained within the containment casing can be suitably housed, and a lid 22, arranged above said base portion 21 and able to fit with it.

The locking pin 3 is capable of assuming a retracted position, in which it is contained within the safety module 1, and an extracted position, in which it is at least partially extracted from the safety module 1.

In particular, the locking pin 3, when it is in said extracted position, projects from the lower surface of the base portion 31.

The function of said locking pin 3 will be further examined in the following.

The safety module 1 also comprises, as mentioned, an activation unit 4, configured to actuate the locking pin, so as to move it from said retracted position to said extracted position.

Said activation unit 4 comprises a coil 41, connected to the control logic of the household appliance, in which the door-lock is installed, which comprises the safety module 1, a spring 42, and mechanical members 43 and 44, intended to allow the movement of said locking pin 3.

The electrical circuit 5 is made with a main plate 51, further connecting plates 52 and 53, and an elastic lamella 54, connected therebetween. In other embodiments, the electric circuit 5 can be made with minor or major elements, plates or connectors.

Said electrical circuit 5 includes a main switch 55, having a first electrode 551, arranged on said main plate 51 and mechanically connected to said locking pin 3, and a second electrode 552, arranged fixed and obviously in correspondence with said first electrode 551, located on said connection plate 53. In this way, when said locking pin 3 is in said extracted position, the main switch 55 is closed, and therefore the first electrode 551 is in contact with the second electrode 552.

Said electric circuit 5 also comprises a sensor switch 56, realized between the elastic lamella 54 and the main plate 51.

Still referring to FIG. 2, it can be observed that a slider 7 is arranged below the safety module 1. The slider 7 of the door-locking device BP has an opening 71 and a safety relief 72.

In general, the slider 7 is capable of interacting with the lug of a door, such that the lug moves the slider 7, so as to allow the relative movement of the same below said safety module 1.

The opening 71 is arranged so as to overlap the locking pin 3 when the washing machine door is closed. In this configuration, said locking pin 3 can pass from the retracted position to the extracted position.

The safety relief 72, on the other hand, raises the safety pin 6, as will be better explained below.

In particular, the safety pin 6 comprises a body 61, having a cylindrical shape, at whose lower base two rotation reliefs 62 and 63 are arranged, placed eccentrically with respect to the axis of symmetry R of the cylinder body 61. The rotation relief 62 is arranged so as to interfere with the safety relief 72 of said slider 7 of the door-lock, to allow for the vertical translational motion and rotation of the safety pin 6, as will be explained in detail in the following.

Furthermore, the safety pin comprises, on the upper base, a relief 64, intended to interfere with the elastic lamella 54, to raise or lower it, and a flap 65, intended to interfere with the main plate 51, as better explained below.

The operation of the safety module 1 described above is as follows.

Referring again to FIGS. 2 and 4, the safety module 1 is located in the open door configuration, in which the locking pin 3 is retracted. Therefore, the main switch 55 is open, and the slider 7 is located in such a position as to overlap with the safety pin 6, so as to prevent with its own encumbrance the even accidental passage from the open position to the closed position.

Furthermore, the safety pin 6 is kept raised by the safety relief 72 of the slider 7, so as to also keep open the sensor switch 56.

With reference to FIG. 6, a Cartesian diagram can be observed having on the abscissas the position of the lug of the household appliance door, such that, as shown in the figure, the shift to the left of the indicator (the circle indicated with the letter C) indicates that the door is closed. The point LP indicates the position of the lug beyond which the door can be closed, i.e., the opening 71 of the slider is overlapped on the locking pin 3, so as to allow its extraction, if necessary.

Instead, the graph on the ordinate shows the state of the sensor 56, which can assume an open position (or "off", as shown in FIG. 2 or 4), or closed (or "on", as explained in detail later).

With reference to FIGS. 7-10, the coordinated operation of the slider 7 and of the safety module 1 can be observed during the closing phase of the household appliance door.

In particular, when the door of the household appliance is closed, the slider 7 is moved in the direction D2, opposite to the direction D1.

The position of the slider 7 is such as to allow the overlapping of the locking pin 3 over the window 72 of the slider 7 and to allow, if necessary, the passage from the retracted position to the extracted position.

Figure 10:
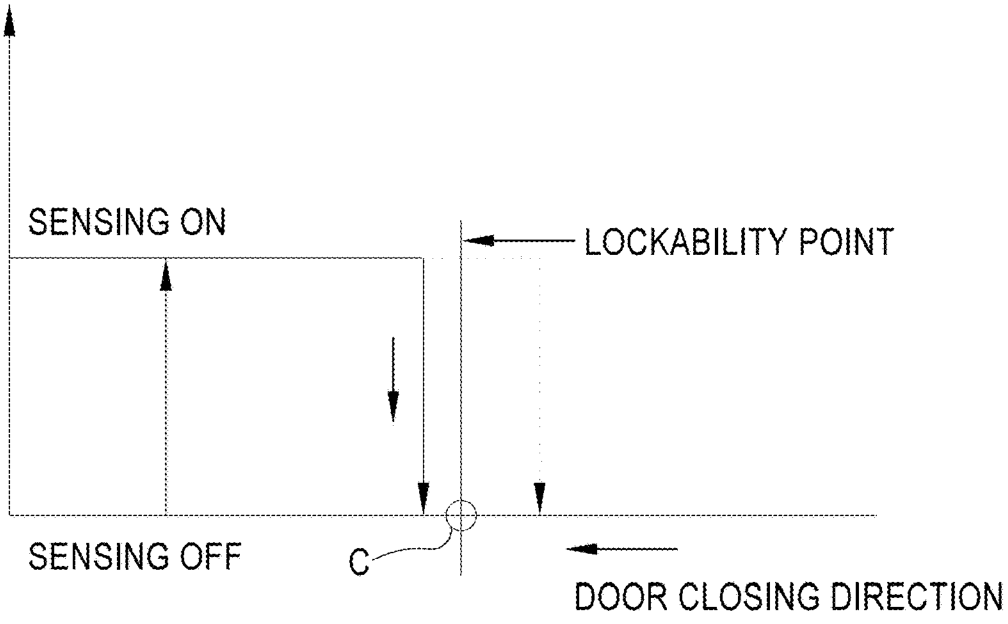
FIG. 10 illustrates a graph showing the activation of a sensor switch with respect to the position of the door lug, when the door is in the closing step.

FIG. 10 shows the position of the indicator C at the point LP, where the door can be locked. In this position, the sensor pin 6 keeps the sensor switch 56 open, while still keeping the elastic lamella 54 raised, due to the safety relief 72.

Figure 11:
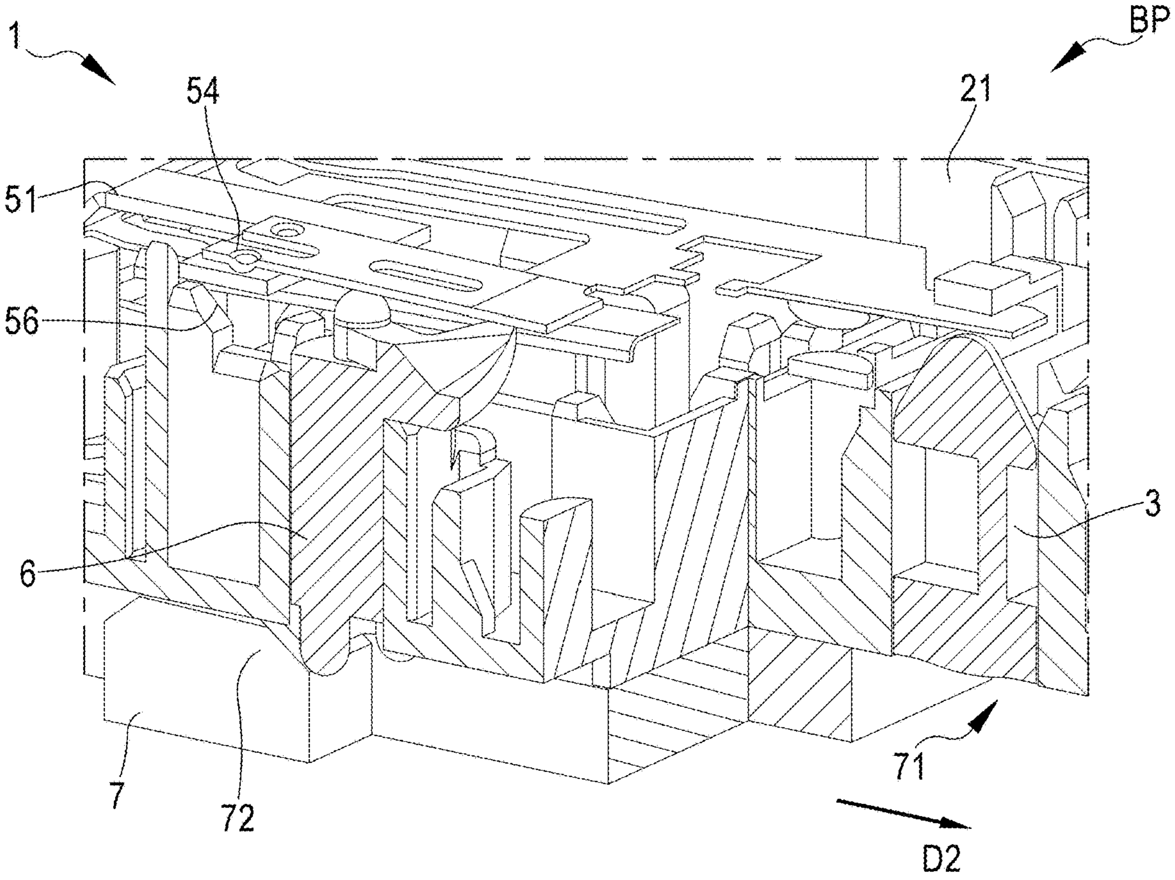
FIG. 11 illustrates a perspective view of a section of a door-locking device according to the present invention when the door is closed.
Figure 12:
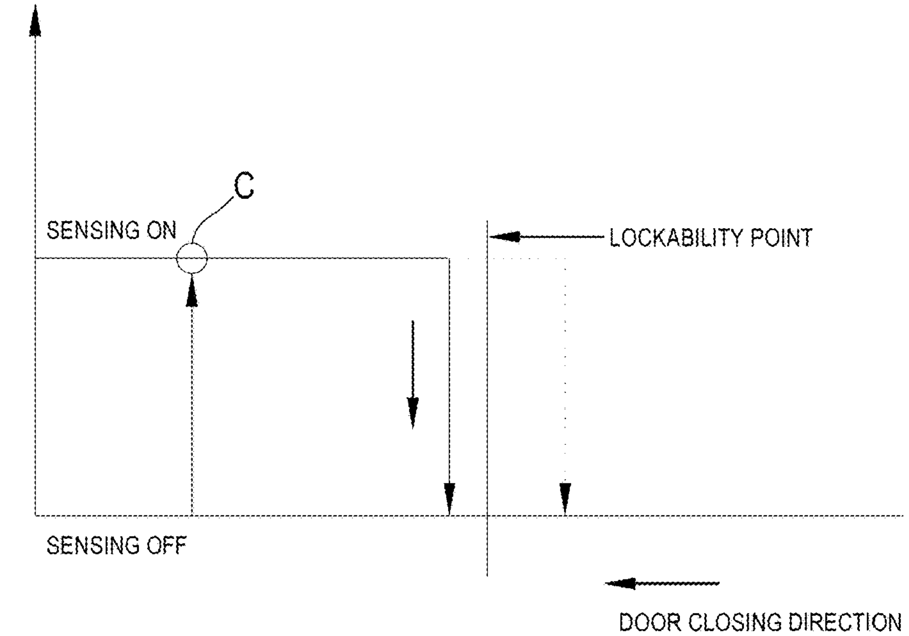
FIG. 12 illustrates a graph showing the activation of a sensor switch with respect to the position of the lug of a door, when the door is closed and a sensor switch is closed.
Figure 13:
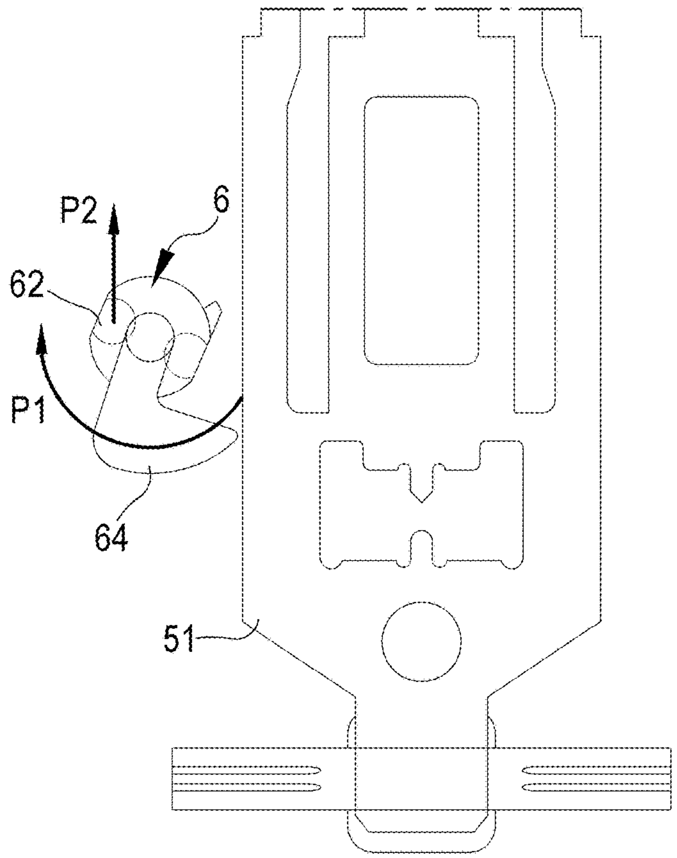
FIG. 13 illustrates a top view of a sensor pin in a first position.
Figure 14:
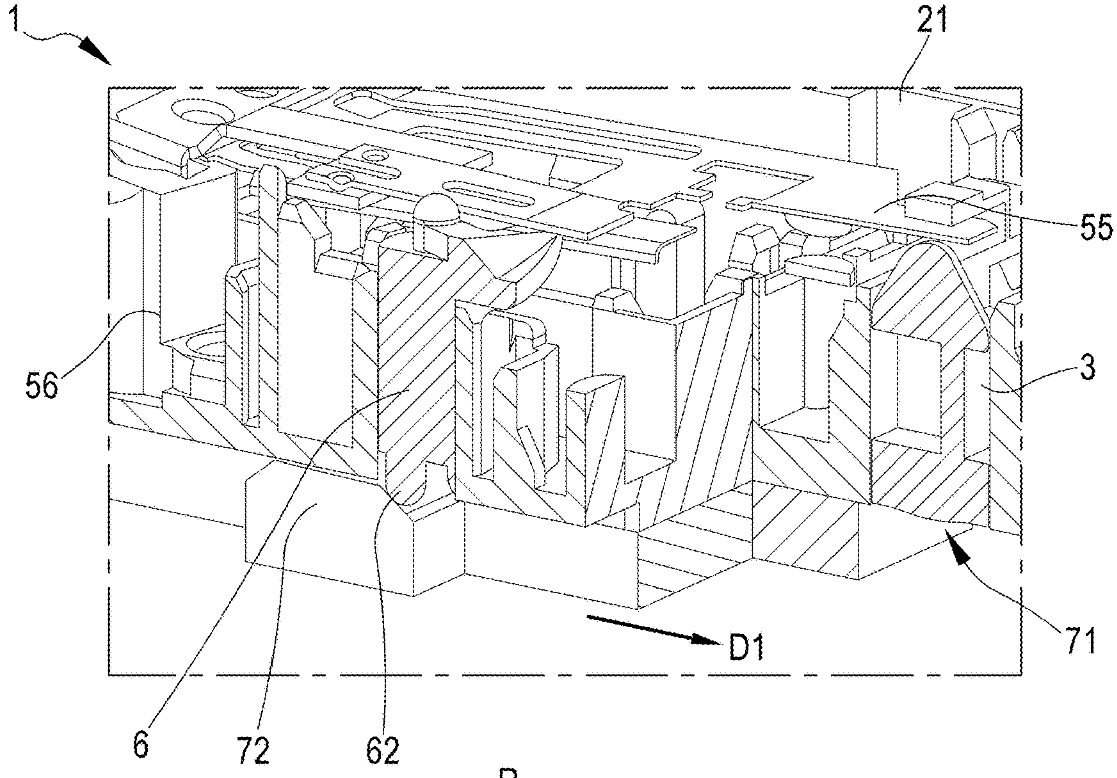
FIG. 14 illustrates a perspective view of a section of a door-locking device while the door is closed.
Figure 15:
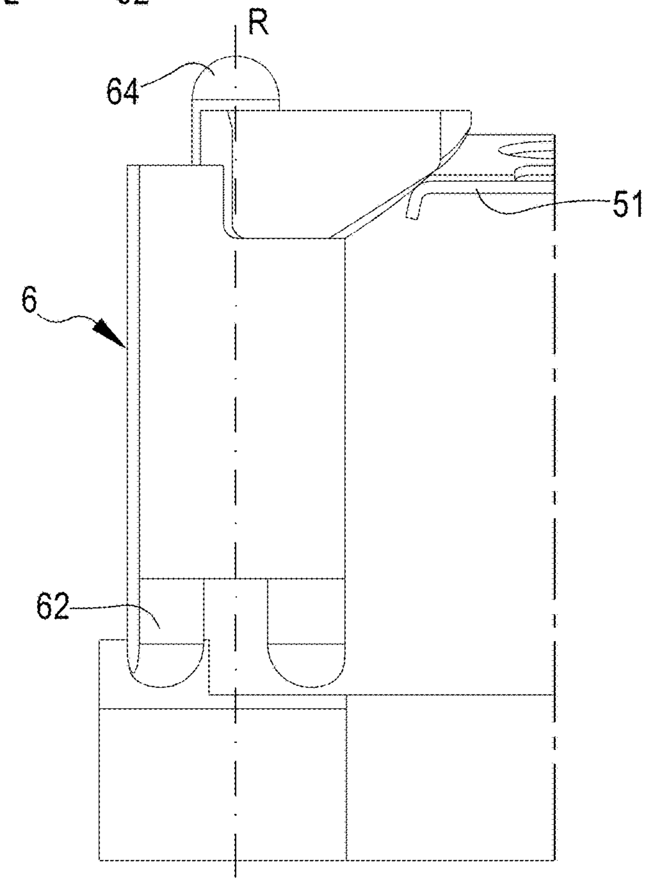
FIG. 15 illustrates the position of a sensor pin while the door is closed.
Figure 16:
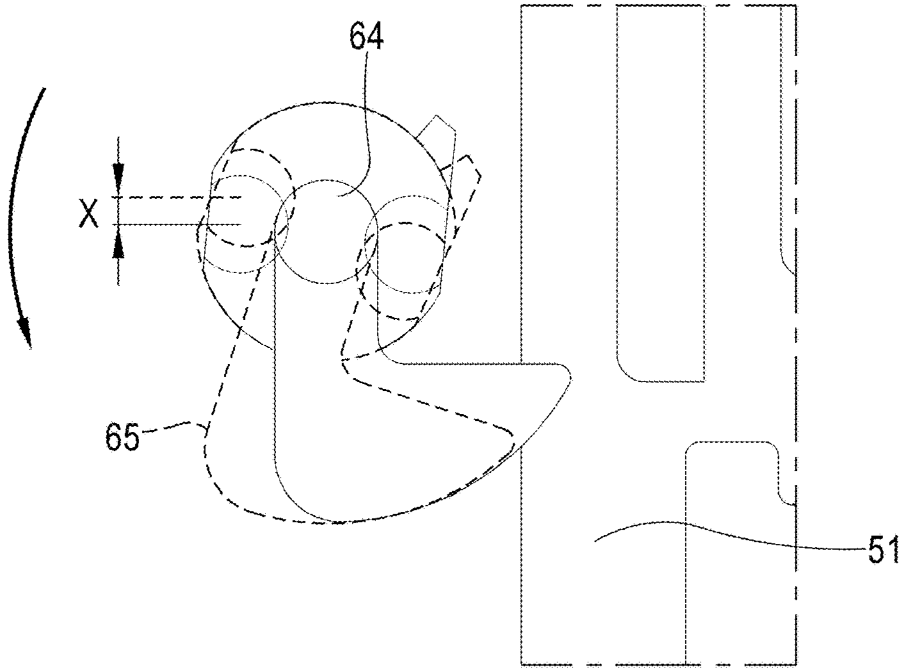
FIG. 16 illustrates a top view of a sensor pin in a second position.
Figure 17:
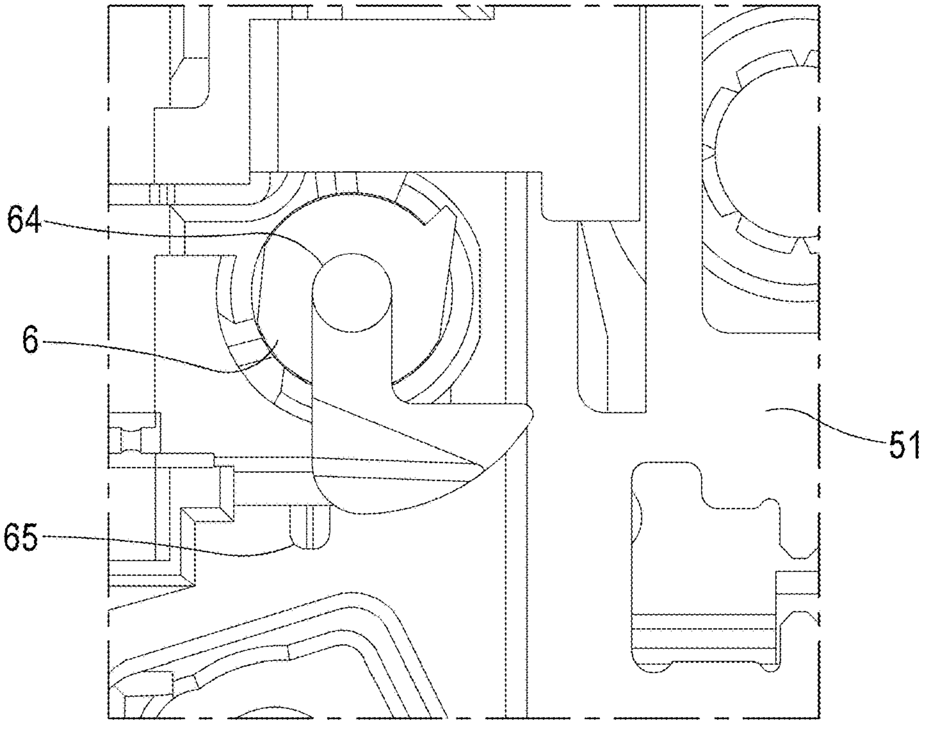
FIG. 17 illustrates the sensor pin in the second position.

Following the sliding of the slider 7 always in the direction D2, the sensor pin 6 is lowered (see FIG. 11), until the sensor switch 56 closes, as can also be seen in FIG. 12, in which the indicator C is in the position that indicates the closure (or "on" position) of the sensor switch 56. In this configuration, with reference to FIG. 13, the sensor pin 6 assumes a first position, making a clockwise rotation (seen from above), such as to allow the disengagement of the flap 65 from said main plate 51.

When the door is open and the door-lock is not active, i.e., when the locking pin 3 is retracted (for example when the washing machine has completed its working cycle), to unlock the door and allow the opening, the control logic moves the locking pin 3 by means of the coil 41 of the activation unit 4. The operation of the safety module 1, therefore, takes place as follows.

With reference to FIGS. 14-18, the slider is free to move in the direction D1, since the locking pin 3 is retracted. In this way, the safety pin 6 is also raised, thanks to the action of the safety relief 72. In this way, the safety pin 6 opens the sensor switch 56. In addition, since the safety relief 72 interferes with the rotation relief 62 of the safety pin 6, which, as mentioned, is arranged eccentrically with respect to the symmetry axis R of the safety pin 6 itself, the latter undergoes a sort of counter-clockwise rotation of an angle $\alpha$, as can be seen in particular in FIG. 16. In this way, the pin passes from a first position, as indicated above, in which the flap 65 does not interfere with the main plate 51, to a second position, in which said flap 65 interferes with the edge of the main plate 51. Since, as mentioned, the locking pin 3 is located in the retracted position, that means that the main plate 51, on which the first electrode 551 of the main switch 55 is located, has such an inclination to act as a stop for the rotation of the sensor pin 6, which, as mentioned, opens the sensor switch 56.

Figure 18:
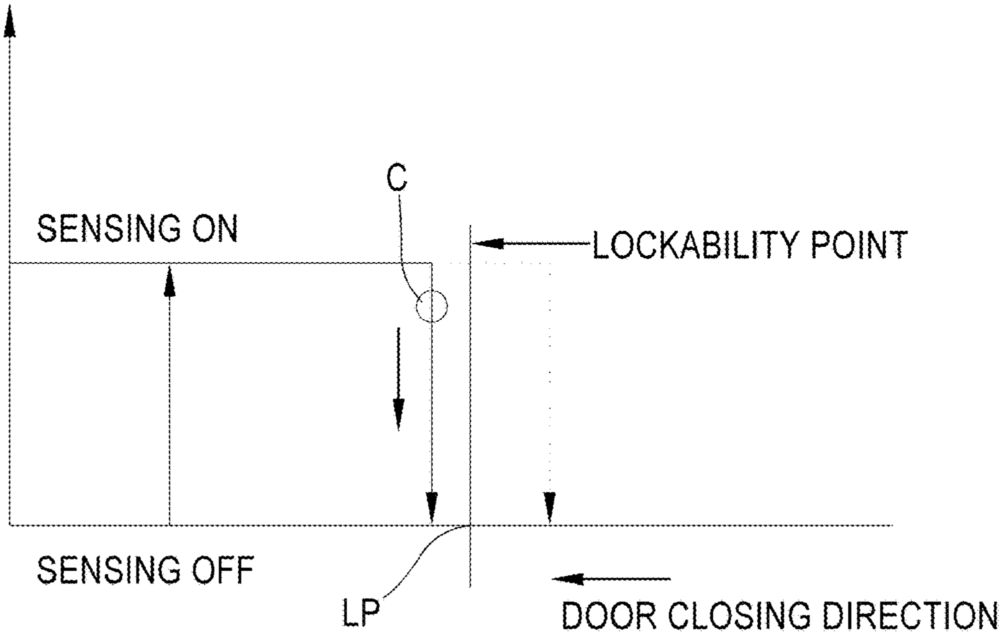
FIG. 18 illustrates a graph showing the activation of a sensor switch with respect to the position of the door lug, while the door is reopened.
Figure 19:
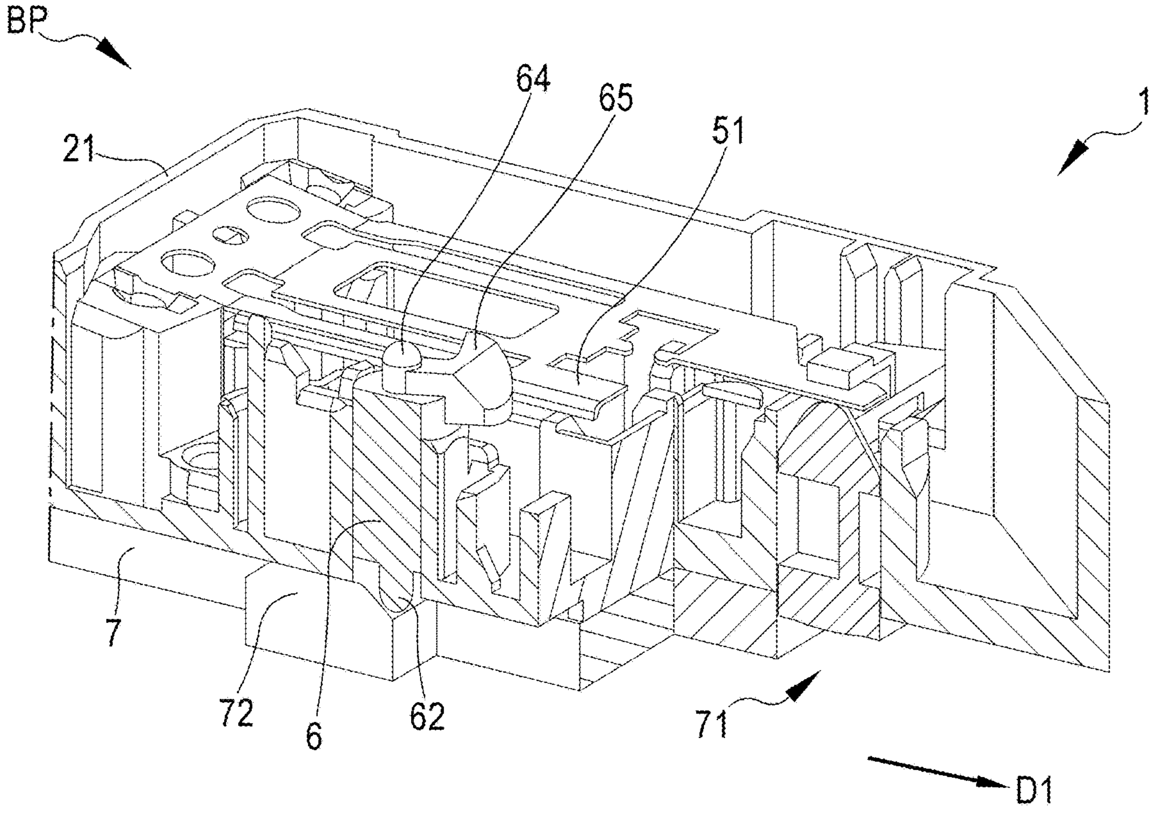
FIG. 19 illustrates a partial section of the door-locking device according to the present invention while the door is being opened.
Figure 20:
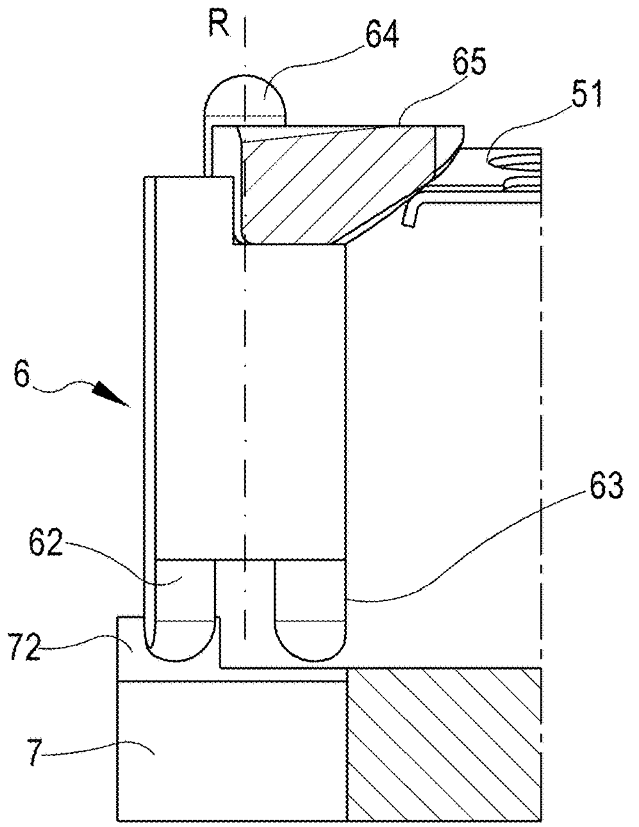
FIG. 20 illustrates the sensor pin interacting with a slider while the door is opened.
Figure 21:
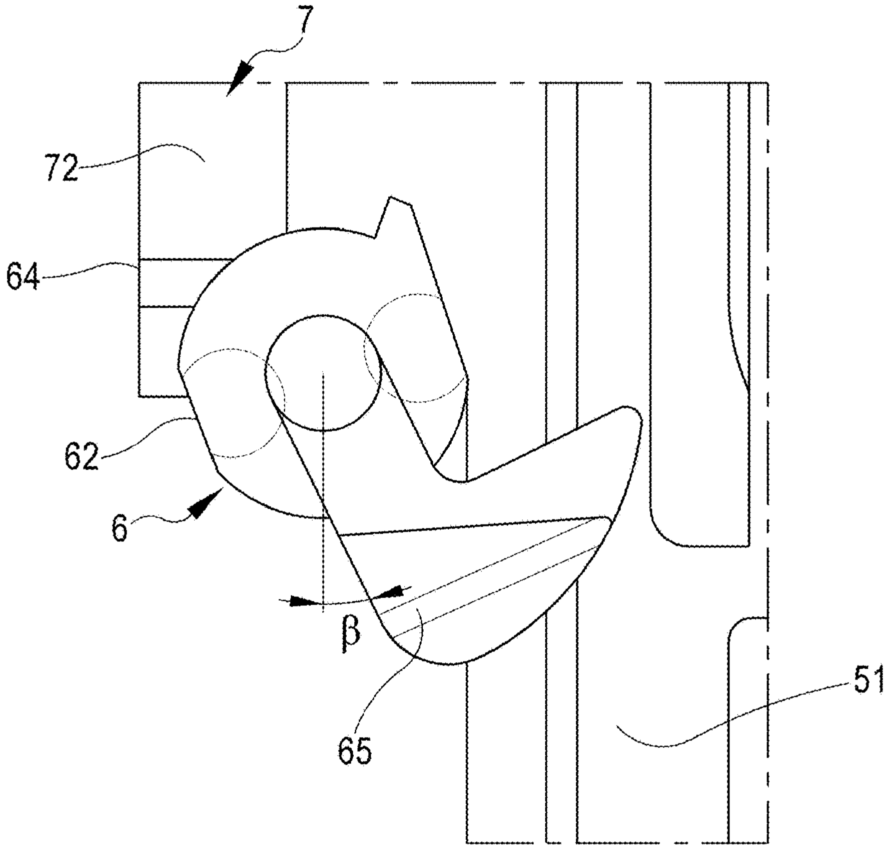
FIG. 21 illustrates a top view of a sensor pin in a third position.
Figure 22:
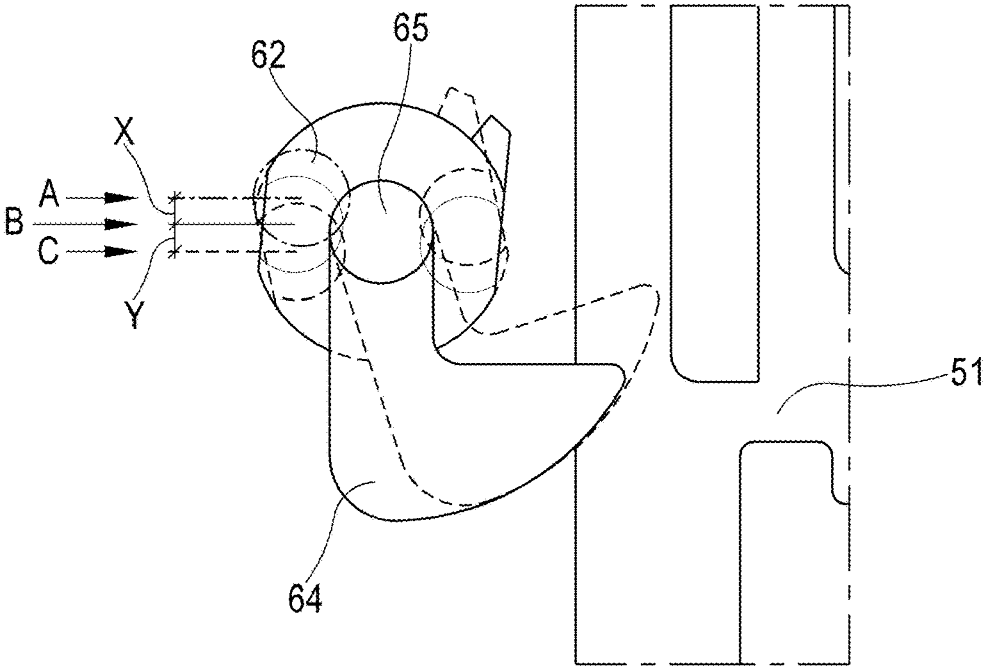
FIG. 22 illustrates a top view in transparency of FIG. 21.
Figure 23:
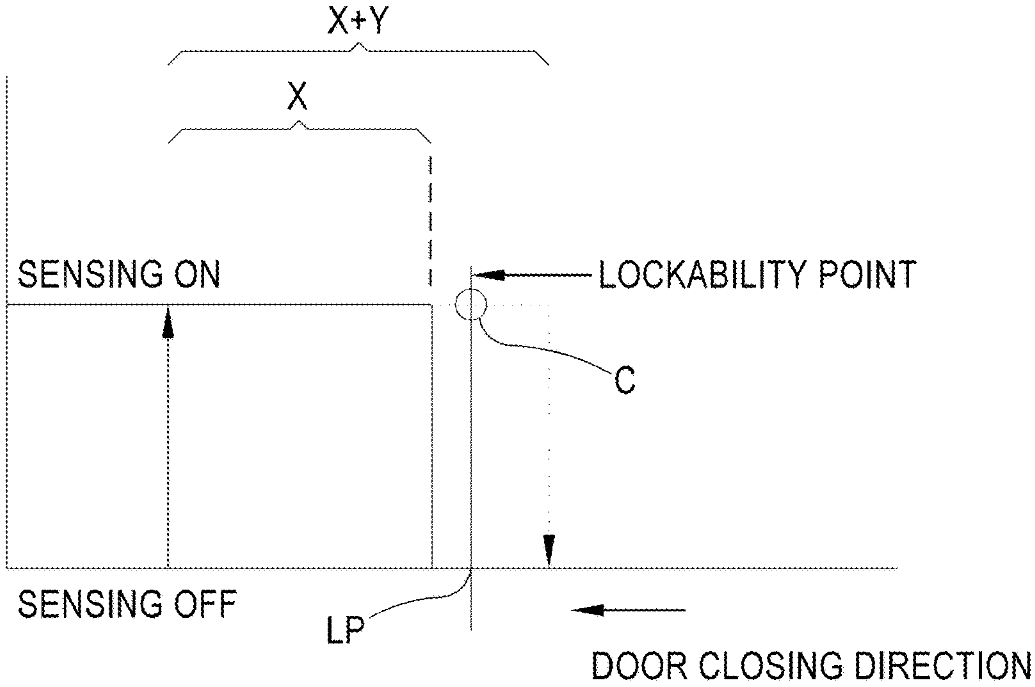
FIG. 23 illustrates a graph showing the activation of a sensor switch with respect to the position of the lug of a door, while the door is opened and the sensor switch remains closed.

This rotation implies a sort of quantity indicated by X in FIG. 18 at the point of contact of the sensor pin 6 with the slider 7. In other words, when the slider 7 intercepts, by means of its safety relief 72, said rotation relief 62, before lifting it, the safety pin 6 rotates at least in part, moving by the aforementioned quantity X, before the main plate 51 blocks its movement, resisting the bending caused by the flap 65.

This has the effect, referring to FIG. 18, that the point at which the sensor switch 56 opens, occurs at a position closer to the locking position LP, with respect to the position in which the same sensor switch 56 is closed when the door is closed. In this way, as regards the operation of the sensor switch 56, a kind of hysteresis, with respect to the movement of the lug, and therefore of the door, is obtained.

Referring now to the case of an attempt to open the washing machine door when the door-lock is activated, or when the locking pin is in the extracted position and then blocks in position the slider 7, the following operation takes place.

With reference to FIGS. 19-23, the locking pin 3 is in the extracted position and therefore engaged with said slider 7, being inserted into said opening 71.

In this situation the main switch 55 is closed, so that the first electrode is lowered and contacts the second electrode 552. The main plate 51, mechanically driven by said locking pin 3, which it is coupled to, also lowers vertically.

The slider 7, moreover, interfering by means of the safety relief 72 with the rotation relief 62, as said eccentric with respect to the symmetry axis R, causes the rotation of the safety pin 6.

The main plate 51 is, as mentioned, in the lowered position. This involves that the safety pin 6 rotates by a second angle β (see FIG. 21), greater than the aforementioned first angle α, before interfering with the edge of the main plate 51, precisely because said main plate 51 is lowered. This rotation implies that the safety pin 6 is raised after the slider 7 travels of an additional space of X+Y, i.e., given by the sum of the displacements of X and Y, shown in FIG. 23.

In this way, there is a sort of hysteresis of the function of the activation of the sensor switch 56 with respect to the position of the door lug, such that the second sensor switch 56 remains closed (position "on"), having the opening point of the switch substantially beyond the point LP (theoretical, because the switch never opens, since the slider 7 cannot slide beyond the point LP, being blocked by the locking pin 3, which is in the extracted position). This therefore makes it possible not to open the sensor switch 56 while the door is closed and the door lock BP is in the locked position.

Figure 24:
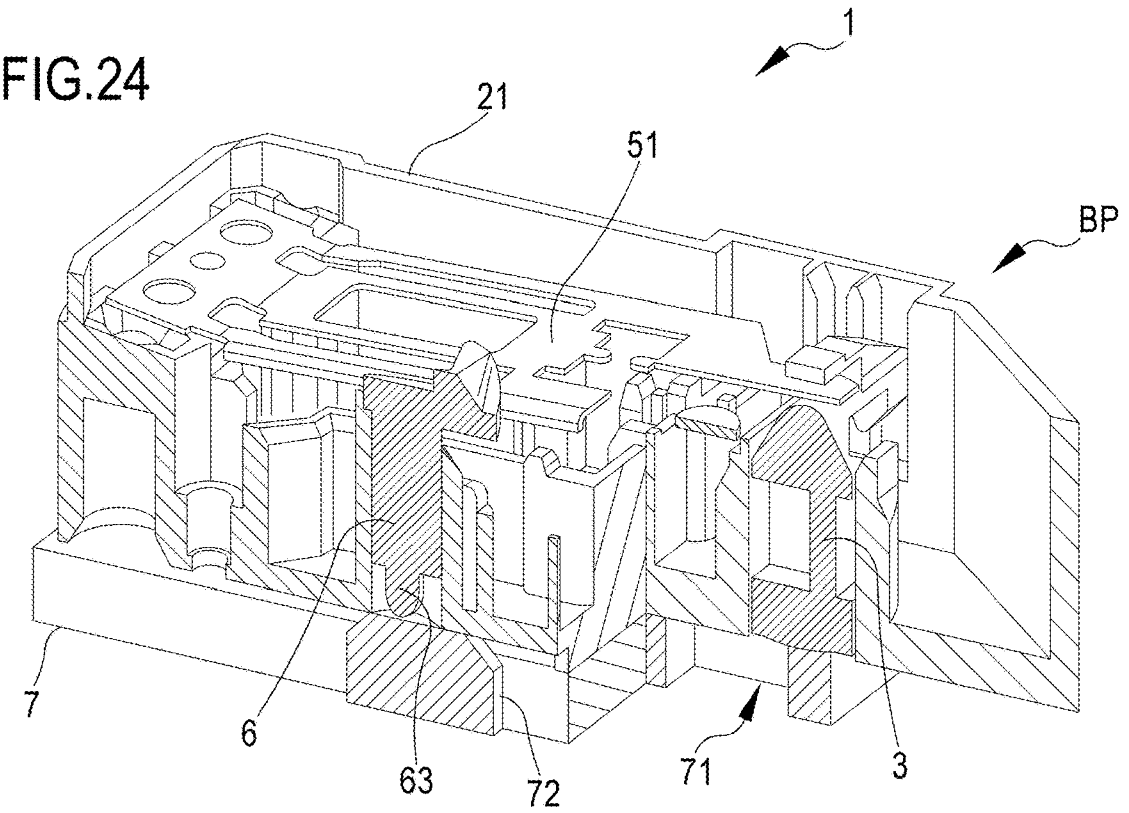
FIG. 24 illustrates a perspective view of a second embodiment of the door-locking device according to the present invention.
Figure 25:
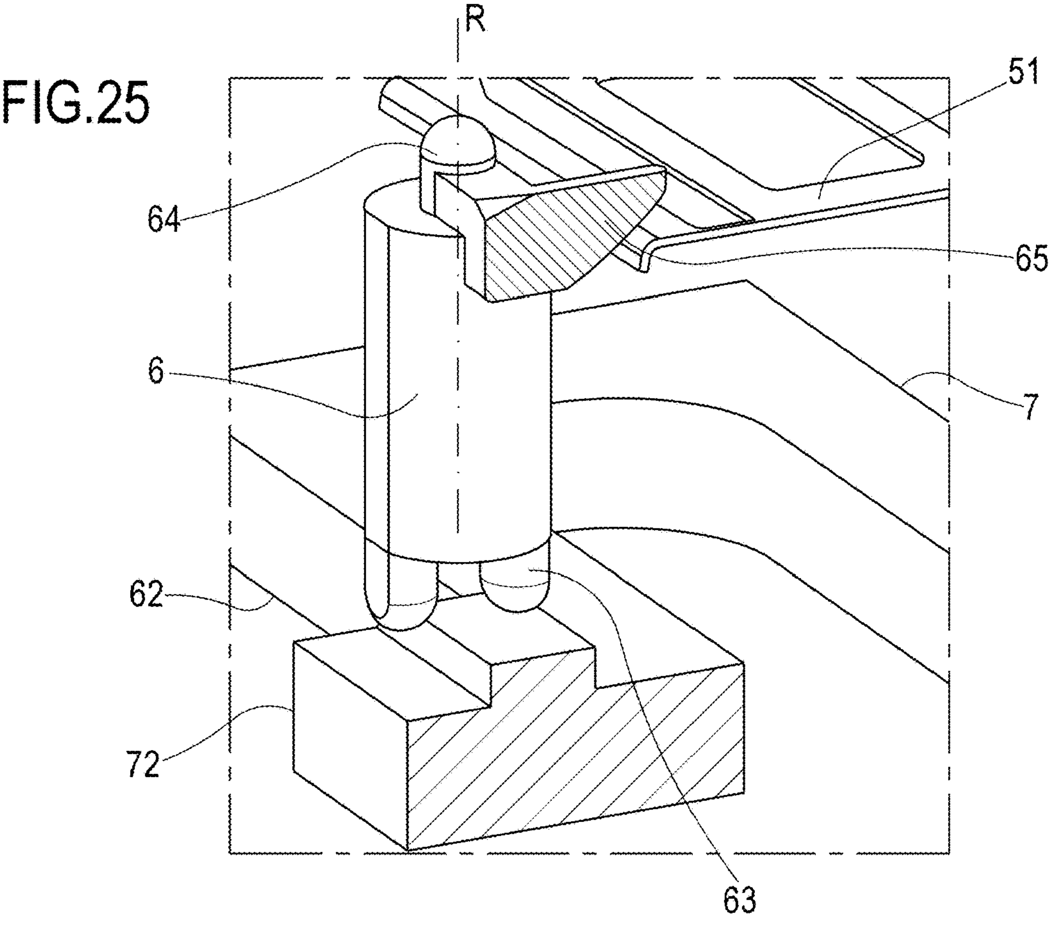
FIG. 25 illustrates a detail of the sensor pin of the door-locking device according to FIG. 24.

Finally, in case of the mechanical configuration of the door-lock is such as to provide a different sliding direction of the slider 7, as shown in FIGS. 24 and 25, in which the direction is opposite to the previous embodiment, in order to have the same functionality and hysteresis is possible to provide the contact between the safety relief 72 and the rotational relief 63 of the safety pin 6, obtaining a reverse rotation of the safety pin 6.

The operation in this case is completely similar to said first embodiment of the door-locking device BP, although in order to pass into said first, second, and third positions, said safety pin 6 carries out rotations contrary to those of the first embodiment described in FIGS. 1-23.

Advantages

An advantage of the present invention is that of allowing the realization of a safer door lock, 0 which allows avoiding the opening the safety switch while the door is locked.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A door-locking device for a household appliance of the type having a door, with a lug, wherein said door-locking device comprises:

(a) a slider arranged so as to assume a disengagement and an engagement position with the lug of the household appliance door, and (b) a detection and safety module, comprising:

(i) a main conductive plate, (ii) a locking pin configured to assume a retracted position, and an extracted position, wherein the locking pin engages with said slider when it is in said engagement position, (iii) a main switch, arranged on said main plate, so as to be opened when said locking pin is in said retracted position, and to be closed when said locking pin is in said extracted position, wherein when said main switch is closed indicates that the slider is locked by said locking pin in said engagement position, (iv) a sensor switch, arranged in series with said main switch, for indicating, when it is closed, that said slider is in said engagement position, and (v) a safety pin that comprises a body of cylindrical shape having an axis of symmetry that is perpendicular to the slider, a lower base and an upper base, wherein the safety pin interferes with said slider so that, when said slider moves from said disengagement position to said engagement position, said safety pin closes said sensor switch, wherein said main conducting plate is fixed to said locking pin, so that when said locking pin is in said retracted position, said main conductive plate is in a first position, instead, when said locking pin is in said extracted position, said main conductive plate is in a second position, and wherein said safety pin comprises:

a lower rotational relief arranged on said lower base of the safety pin, wherein the lower rotational relief is eccentrically arranged with respect to the axis of symmetry of the safety pin, wherein when said slider interferes with said lower relief, the slider rotates said safety pin, and a flap arranged in correspondence with the upper base of the safety pin so that, when said safety pin rotates, the flap interferes with said main conductive plate, wherein the rotation of said safety pin changes according to the position of said main conductive plate.

2. The door-locking device according to claim 1, wherein said slider comprises a safety relief which interferes with said lower relief when said slider moves from said disengagement position to said engagement position.

3. The door-locking device according to claim 1, wherein said safety pin comprises a second rotational relief eccentrically arranged with respect to said axis of symmetry.

4. The door-locking device according to claim 1, comprising an elastic lamella arranged so as to interfere with an upper relief of said safety pin, wherein said sensor switch comprises said main plate and said elastic lamella.

5. The door-locking device according to claim 4, wherein said upper relief is configured to raise or lower said elastic lamella.

6. The door-locking device according to claim 1, wherein said slider has an opening, arranged so that, when said slider is in said engagement position, said opening in arranged in correspondence with said locking pin, allowing the movement of said locking pin from said retracted position to said extracted position.

7. The door-locking device according to claim 1, wherein the the door locking device is part of a washing machine or a dishwasher.

* * * * *